United States Patent [19]
Erickson

[11] Patent Number: 5,452,631
[45] Date of Patent: Sep. 26, 1995

[54] APPARATUS FOR HOLDING A TOOLHOLDER SHANK UTILIZING A ROTATABLE CAM TO MINIMIZE KICKBACK

[75] Inventor: Robert A. Erickson, Raleigh, N.C.

[73] Assignee: Kennametal Inc., Latrobe, Pa.

[21] Appl. No.: 224,428

[22] Filed: Apr. 8, 1994

[51] Int. Cl.⁶ ................................................. B23B 29/04
[52] U.S. Cl. ............................................. 82/160; 409/234
[58] Field of Search ................................. 409/234, 233, 409/232; 82/160; 408/239 R, 230

[56] References Cited

U.S. PATENT DOCUMENTS

| | | | |
|---|---|---|---|
| 4,680,999 | 7/1987 | Kojima et al. | 82/36 |
| 4,747,735 | 5/1988 | Erickson et al. | 409/234 |
| 4,843,929 | 7/1989 | Andersson | 82/160 |
| 4,981,057 | 1/1991 | von Haas et al. | 82/160 |
| 5,054,344 | 10/1991 | Erickson et al. | 409/233 X |
| 5,169,270 | 12/1992 | Erickson | 82/160 X |
| 5,173,017 | 12/1992 | Oshnock et al. | 409/234 |
| 5,245,896 | 9/1993 | Erickson et al. | 82/160 |
| 5,279,194 | 1/1994 | Armbrust | 409/233 X |

FOREIGN PATENT DOCUMENTS

| | | | |
|---|---|---|---|
| 3344467 | 6/1985 | Germany. | |
| 9002011 | 3/1990 | WIPO | 82/160 |

OTHER PUBLICATIONS

Kennametal Drawing No. D–001 entitled "Toolholder Clamping Mechanism".

*Primary Examiner*—William Briggs
*Attorney, Agent, or Firm*—James G. Porcelli

[57] ABSTRACT

An apparatus for releasably holding a tubular toolholder shank by axially reciprocating a lock rod between a locked and unlocked position. The lock rod is reciprocated using a rotatable cam. The rotatable cam activates a preloaded spring to generate a force securing the lock rod in the locked position. The rotatable cam includes a non-cylindrical cam post to minimize a kickback force that may be caused by the preloaded spring on the cam post as the lock rod is moved from the locked to the unlocked position.

10 Claims, 7 Drawing Sheets

LOCKED POSITION

UNLOCKED POSITION

LOCKED POSITION

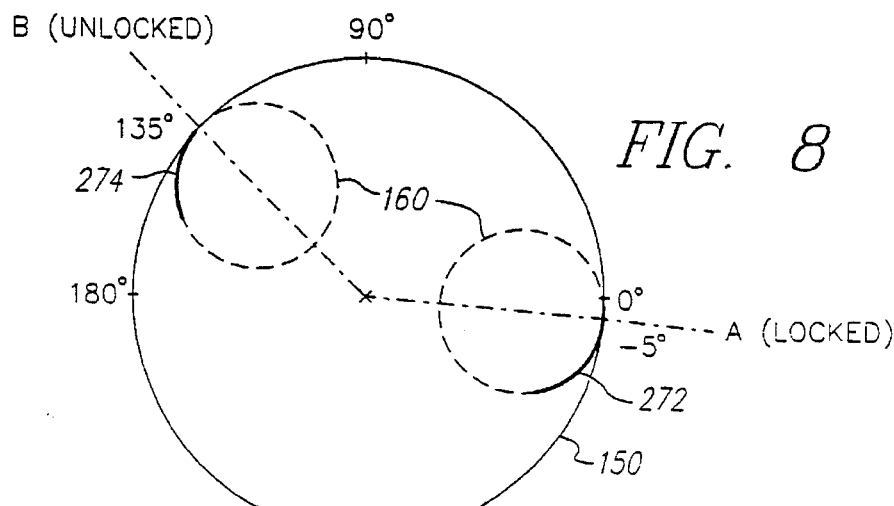
FIG. 8
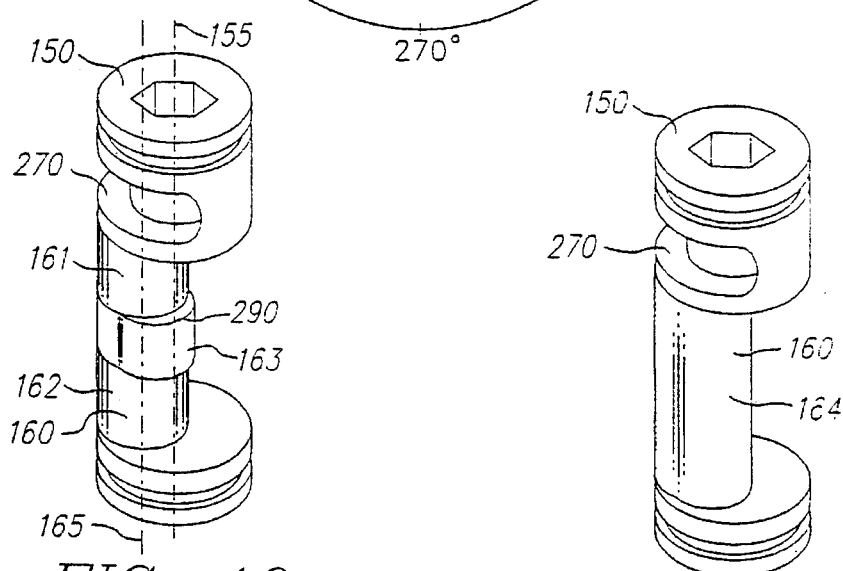
FIG. 10
FIG. 11
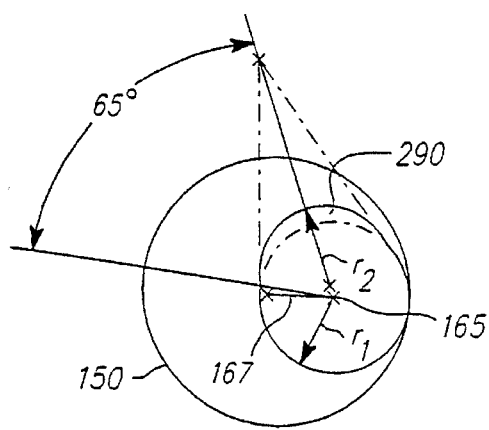
FIG. 12
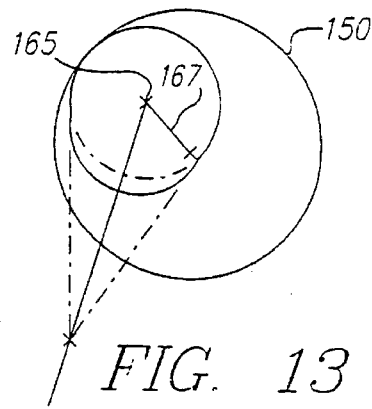
FIG. 13

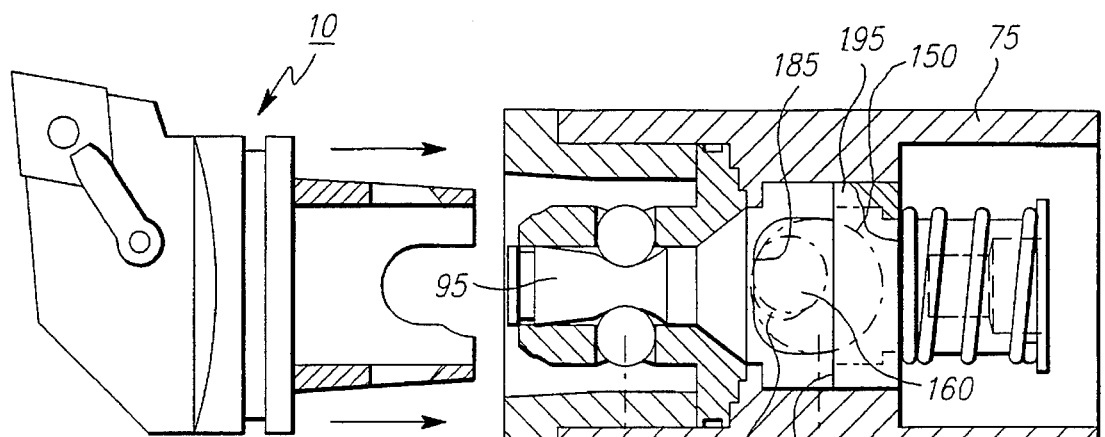
FIG. 14    UNLOCKED POSITION
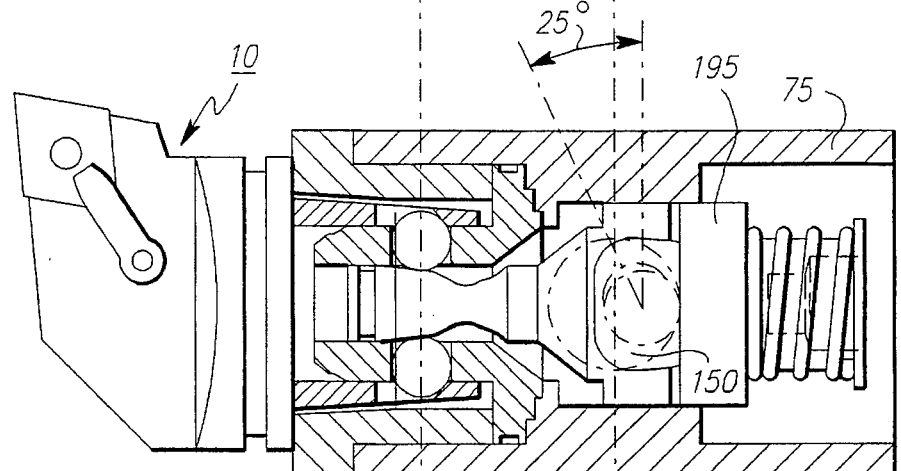
FIG. 15    LOCKED POSITION
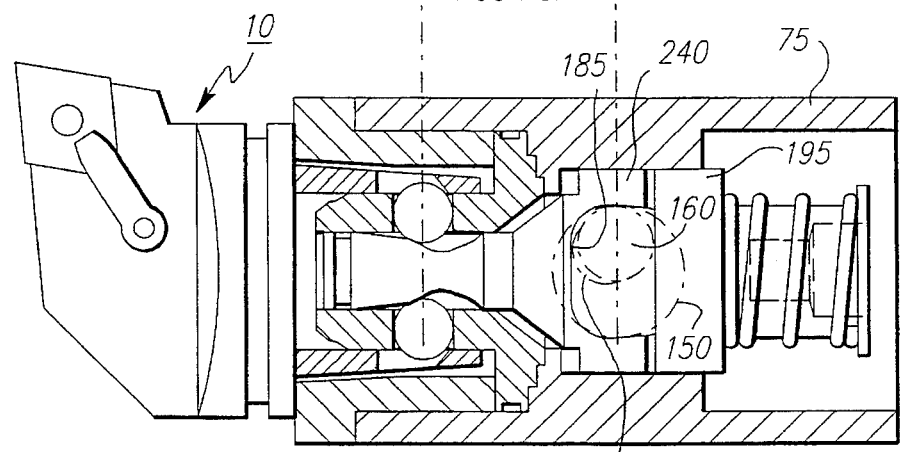
FIG. 16    INTERMEDIATE POSITION

APPARATUS FOR HOLDING A TOOLHOLDER SHANK UTILIZING A ROTATABLE CAM TO MINIMIZE KICKBACK

CROSS-REFERENCE TO RELATED APPLICATION

This application is copending with application Ser. No. 08/224,925 entitled "Apparatus For Holding a Toolholder Shank," filed Apr. 8, 1994.

BACKGROUND OF THE INVENTION

The present invention relates to an apparatus for securing a toolholder within a base and, more specifically, relates to the use of a cam mechanism for manipulating a lock rod to secure a toolholder within a base.

As an overview, metalworking operations are typically performed using a cutting insert of a hard metal. Such an insert is mounted to a toolholder. The toolholder is secured either temporarily or permanently to a base member which is part of a machine such as a lathe or a milling machine.

Because of the extreme conditions under which they operate, cutting inserts must be replaced on a regular basis. In order to do this, the cutting insert must be removed from the toolholder. The economies of the metalworking operation make it inefficient to shut a machine down for the length of time required to replace a cutting insert on a toolholder. It is more desirable to utilize a removable toolholder such that the entire toolholder with the accompanying cutting insert may be removed and replaced with another toolholder having a new cutting insert already in position on the toolholder.

With this in mind, the focus for efficiency then becomes the ease and speed with which the toolholder may be replaced. This has been one of the motivating factors producing different commercial designs for quick change toolholders.

One example of such a design may be found in U.S. Pat. No. 4,747,735 entitled "Toolholder and Method of Releasably Mounting" by Erickson et al. which is assigned to the applicant of the subject invention and which is hereby incorporated by reference. This reference teaches a spring loaded reciprocating lock rod which is urged rearwardly by the springs to move locking members radially outwardly to secure a toolholder within the toolholder support member. In order to release the toolholder, the lock rod must be advanced against the spring force so that the locking members are retracted and, furthermore, so that the toolholder is bumped from the toolholder support member. The locking mechanism described in this patent must be activated axially and is not capable of side activation.

SUMMARY OF THE INVENTION

The invention is an apparatus for releasably holding a tubular toolholder shank comprised of a base member having a forwardly facing surface and a bore intersecting the forwardly facing surface and extending rearwardly therefrom for receiving the toolholder shank. Within the base member extending along a longitudinal axis is a lock rod with a forward and rearward end. The lock rod is movable in a rearward and forward reciprocating motion for pulling the toolholder shank within the bore into a locked position and for pushing the toolholder shank from the bore to an unlocked position. Additionally, the lock rod has an aperture transverse to the longitudinal axis to define a forward wall which acts as a lock rod cam follower surface. A rotatable cam is mounted to the base member and has a cam post which extends through the aperture in the lock rod. The cam is operable upon the lock rod to provide the rearward and forward reciprocating motion. A collar having a cam follower surface is slidably positioned to a flange on the lock rod proximate to the cam post. A spring is positioned between the collar and lock rod rearward end for urging the lock rod to the locked position. The cam post by rotation of the cam acts against the collar cam follower surface to compress the spring and urge the lock rod to the locked position and by rotation of the cam in the opposite direction to decompress the spring and unlock the lock rod. The cam post acts to limit the spring decompression by creating interference between the lock rod cam follower surface and the collar cam follower surface.

In one embodiment of the invention the cam post has a first cam segment comprised of a cylindrical section and a second cam segment comprised of a non-cylindrical section for contacting the lock rod cam follower surface and the collar cam follower surface.

In a second embodiment of the invention the cam post is comprised of a cam segment having a singular non-cylindrical section for contacting the lock rod cam follower surface and the collar cam follower surface.

In a third embodiment of the invention the cam post is comprised of a first cam segment having a cylindrical section and a second cam segment having a cylindrical section offset from the first section such that the lock rod cam follower surface and the collar cam follower surface are contacted and separated by the sections.

BRIEF DESCRIPTION OF THE DRAWINGS

The foregoing and other aspects of the present invention will become more apparent upon review of the following detailed description of the invention in conjunction with the drawings which are briefly described below.

FIG. 8 shows the relative position of the rotatable cam in the locked and unlocked positions.

FIG. 10 shows an isometric view of the rotatable cam in which the cam has a non-circular segment in accordance with a second embodiment of the invention.

FIG. 11 illustrates the cam shown in FIG. 10 with the non-circular position extending the entire length of the cam surface.

FIG. 12 shows a cutaway top view of the cam in FIG. 10 in the locked position.

FIG. 13 shows a cutaway top view of the cam in FIG. 10 in the unlocked position.

FIG. 14 shows a sectional side view of the toolholder base in the unlocked position in which the rotatable cam has a post similar to that of the cross-section shown in FIG. 11.

FIG. 15 shows a sectional side view of the toolholder base in the locked position in which the rotatable cam has a post similar to that of the cross-section shown in FIG. 11.

FIG. 16 shows a sectional side view of the toolholder base in a position between the unlocked and locked position in which the rotatable cam has a post similar to that of the cross-section shown in FIG. 11.

DETAILED DESCRIPTION OF THE INVENTION

Figure 1:
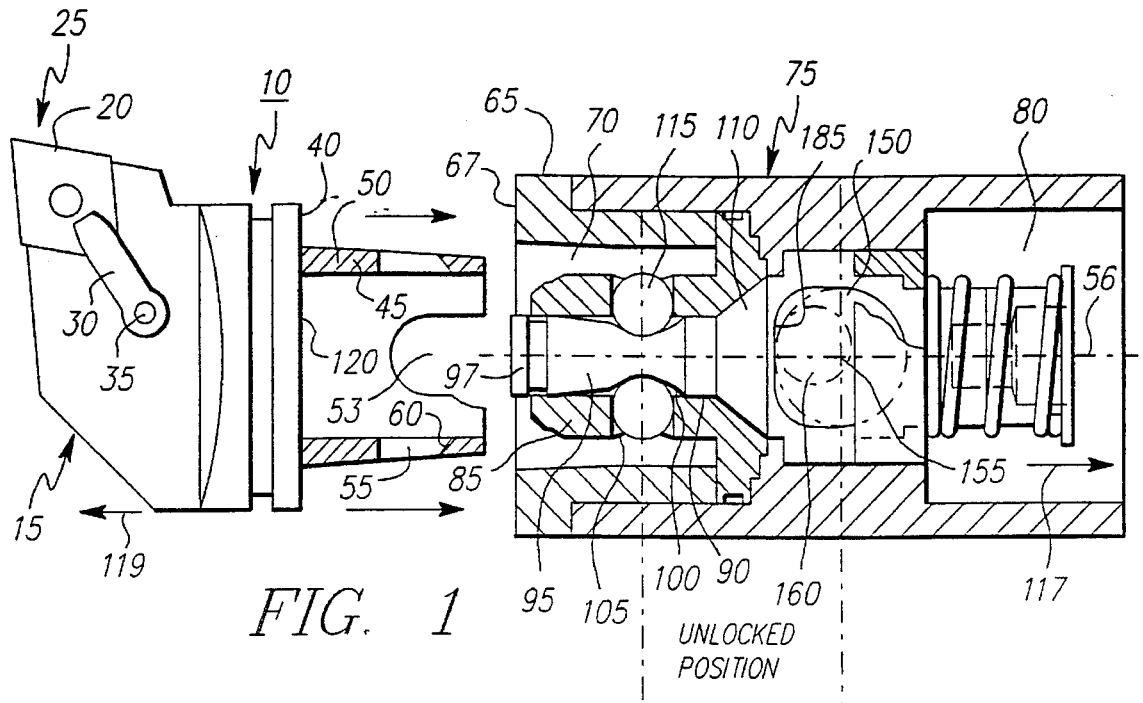
FIG. 1 shows a sectional side view of the toolholder base in the unlocked position.

FIG. 1 shows a toolholder 10 having a forward end 15 on which a cutting insert 20 is mounted. The cutting insert 20 may be spaced from the toolholder 10 by a shim (not shown), and both the cutting insert 20 and the shim 25 are held to the toolholder 10 by means such as a clamp 30 which is secured to the toolholder 10 by a pin 35. The toolholder 10 has a rearwardly facing abutment face 40 and a tubular shank 45 with a shank wall 50 extending rearwardly from the forward end 15. The toolholder 10 may have an alignment slot 53 within the shank wall 50. Within the shank wall 50 are spaced perforations 55. The toolholder 10 may have forwardly facing concave contact surfaces 60 within the perforations 55.

The toolholder 10 is positioned about a longitudinal axis 56. This longitudinal axis 56 will be used as a reference throughout the specification. As evidenced by the drawings, many features discussed in the specification are symmetric about the longitudinal axis 56. For this reason, oftentimes reference will be made to a single item with the understanding that such a discussion will also apply to the other duplicate items.

The toolholder shown in FIG. 1 is typical of a toolholder used for non-rotating tooling such as a lathe. However, it should be understood that the toolholder may have attached to it any one of a variety of tools that may be associated with either non-rotating or rotating applications. Additionally the toolholder 10 portion proximate the forward end 15 is typically rotated relative to the tubular shank 45 an amount of 90° about the longitudinal axis 56. However, for purposes of explaining the subject invention, the current orientation will be used.

Additionally, in the figures the toolholder shank is shown radially separated from the receiving bore. It should be understood that the invention is directed toward the cam and lock rod and that the mating between the toolholder and receiving bore could be as shown or could involve an interference fit.

A toolholder receiving member 65 having a forwardly facing abutment surface 67 and an opening comprised of a bore 70 about the longitudinal axis 56 is secured to and is a part of a base member 75.

Within a passageway 80 extending through the base member 75 is a stub 85 which extends into the bore 70 of the toolholder receiving member 65. A bore 90 extends longitudinally through the stub 85 and a lock rod 95 is slideably mounted within the bore 90.

Toward the forward end 97 of the lock rod 95 are depressions 100 which may be aligned with radial apertures 105 extending through the stub 85. The lock rod 95 may be moved along the longitudinal axis 56 by pulling or pushing on the lock rod at any location, but preferably at the base 110 which is an integral part of the lock rod 95. When the lock rod 95 is pulled away from the toolholder 10, locking elements 115 positioned within the apertures 105 of the stub 85 and within the depressions 100 of the lock rod 95 are urged radially outwardly.

FIG. 1 shows the toolholder 10 removed from the toolholder base 75. In order to secure the toolholder 10 within the toolholder base 75, the lock rod 95 is positioned such that the locking elements 115 are within the depressions 100 and recessed within the radial apertures 105. In this orientation, the tubular shank 45 of the toolholder 10 may be inserted into the bore 70.

Figure 2:
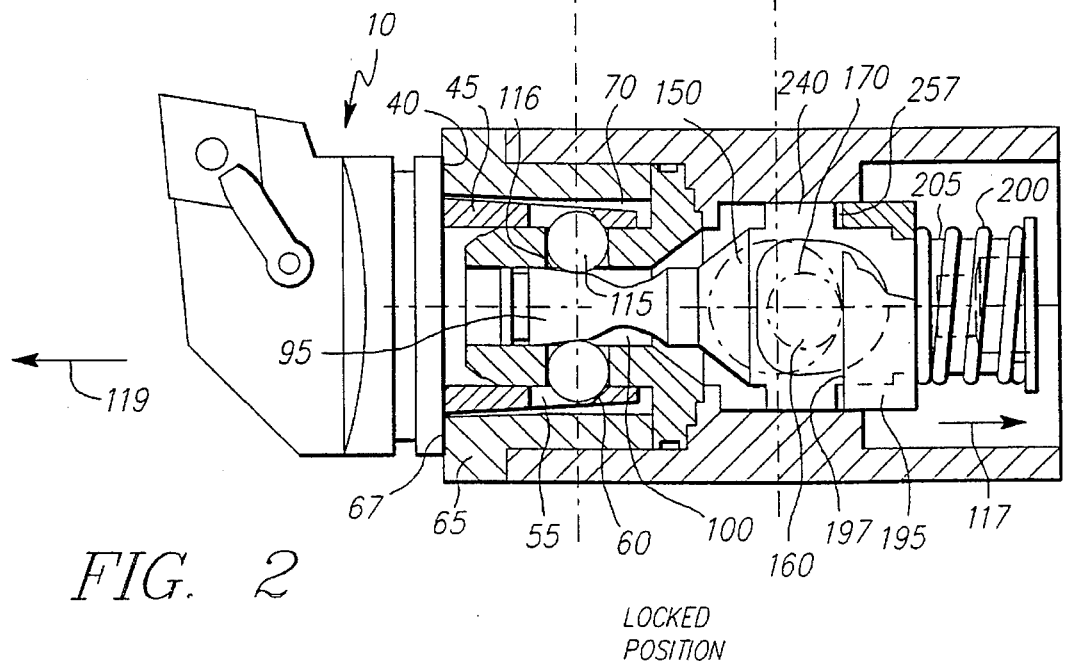
FIG. 2 shows a sectional side view of the toolholder base in the locked position in which the toolholder is secured.

As shown in FIG. 2, with the toolholder 10 positioned within the bore 70, the lock rod 95 may be pulled in the direction of arrow 117 away from the toolholder 10 such that the locking elements 115 are displaced radially outwardly from the depressions 100 onto ramps 116 thereby causing the locking elements 115 to penetrate the perforations 55 and contact the fowardly facing concave contact surfaces 60 of the toolholder shank 45. When the lock rod 95 is retracted in the direction of arrow 117, the toolholder 10 is urged within the toolholder receiving member 65 and the rearwardly facing abutment face 40 of the toolholder 10 contacts the forwardly facing abutment surface 67 of the toolholder receiving member 65. This action of the lock rod 95 secures the toolholder 10 within the toolholder receiving member 65.

In order to release the toolholder 10 from the toolholder receiving member 65 the lock rod 95 is urged toward the toolholder 10 in the direction of arrow 119. In such a manner, the locking elements 115 are retracted within the radial aperture 105 and depression 100 so that adequate clearance is provided and the toolholder 10 may be removed from the toolholder receiving member 65 as shown in FIG. 1.

When the toolholder 10 is locked within the base 75, there may exist elastic deformation of the toolholder receiving member 65 thereby creating high frictional forces retaining the toolholder 10 within the toolholder receiving member 65. To release the toolholder 10, the lock rod 95 is extended at the forward end of the toolholder receiving member 65 such that the lock rod 95 protrudes beyond the stub 80 and contacts an impact area 120 within the tubular shank 45 of the toolholder 10. In such a manner, continued urging of the lock rod 95 toward the toolholder 10 will force the lock rod 95 against the impact area 120 thereby ejecting the toolholder 10 from the toolholder base 75. Therefore, by moving the lock rod 95, the toolholder 10 may be secured or released within the base member 75 thereby providing for quick changing of the toolholder 10.

The focus of the subject invention is on the mechanism used to advance the lock rod 95 in the direction of arrow 119 to the released position as shown in FIG. 1 and to retract the lock rod 95 in the direction of arrow 117 to secure a toolholder 10 in the locked position as shown in FIG. 2.

Figure 3:
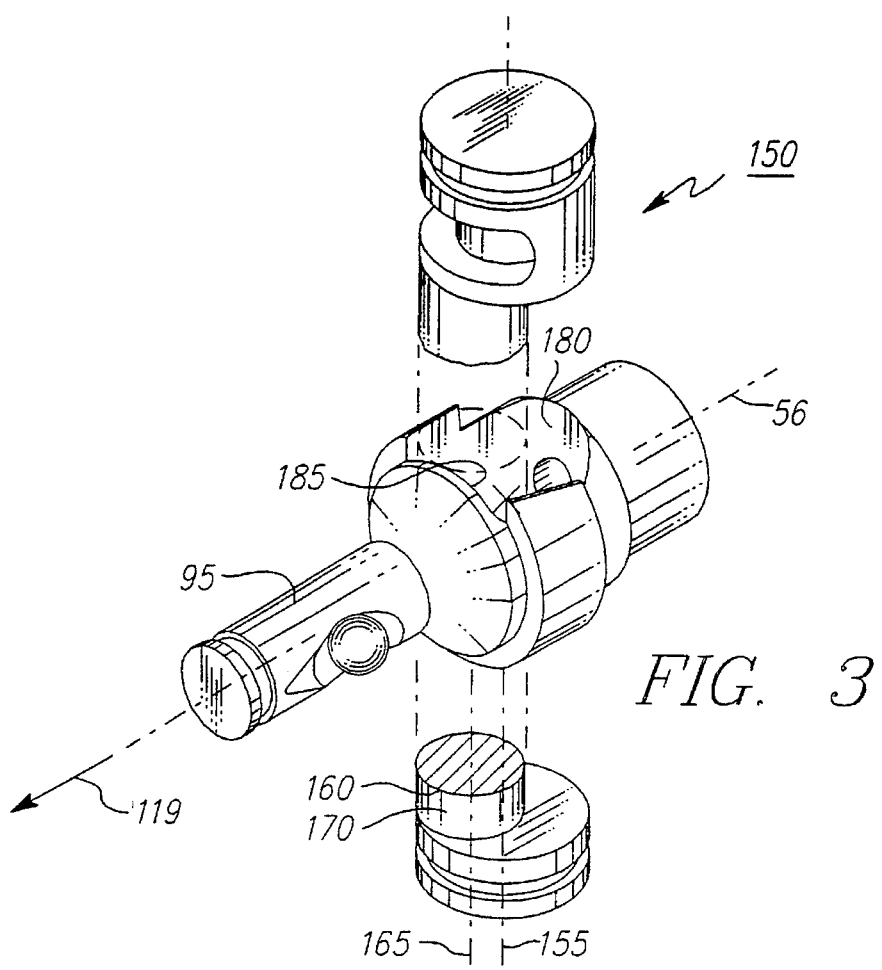
FIG. 3 shows an isometric view of a rotatable cam contacting the lock rod in its forwardmost position.
Figure 4:
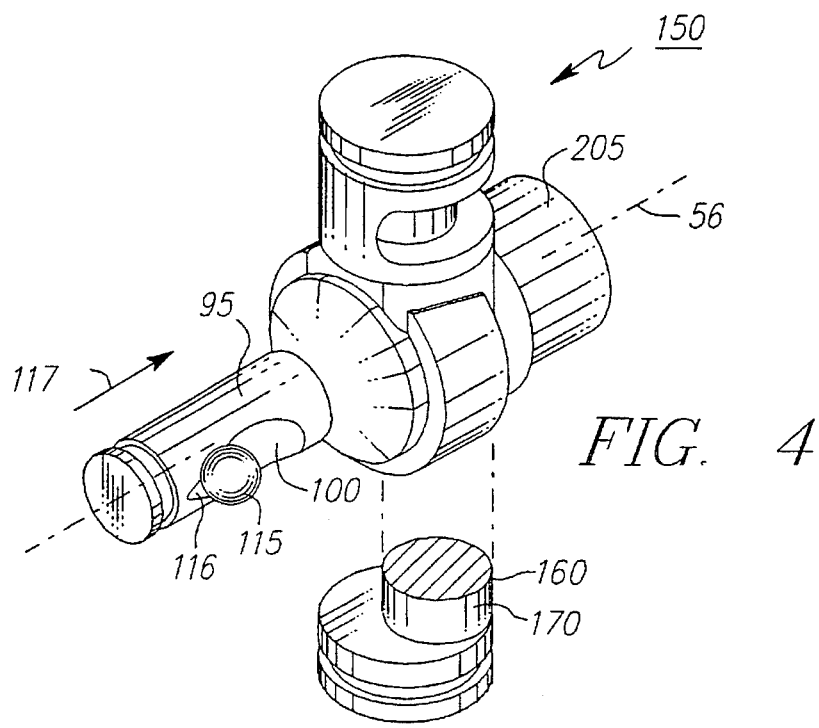
FIG. 4 shows an isometric view of the rotatable cam urging the lock rod to its rearwardmost position.

Key elements of this mechanism as shown in FIGS. 1 and 2 are highlighted in FIG. 3 and 4. Specifically, FIG. 3 shows the lock rod 95 in its forwardmost position similar to that shown in FIG. 1. A rotatable cam 150 with a longitudinal axis 155 extending therethrough has a cam post 160 which may be cylindrical in shape. The cam post 160 has a longitudinal axis 165 offset from the longitudinal axis 155 of the cam 150. The cam post 160 has at least one cam surface 170. The rotatable cam 150 is positioned within an aperture 180 extending through the lock rod 95 thereby creating on the lock rod 95 a cam follower surface 185 on the forward portion of the aperture 180 wall. The cam 150 is laterally secured within the base member 75 (FIG. 1) such that only rotation about the cam longitudinal axis 155 is permitted. The lock rod 95, on the other hand, is permitted to move axially along longitudinal axis 56. In such a fashion, as shown in FIGS. 1 and 3, in one position of the cam 150, the cam surface 170 of the cam post 160 contacts the cam follower surface 185 of the lock rod 95 to urge the lock rod 95 in the direction of arrow 119 to the unlocked position. In a second position of the cam 150, shown in FIGS. 2 and 4, the cam surface 170 of the cam post 160 urges the lock rod 95 in the direction of arrow 117 thereby causing the locking elements 115 to leave the depression 100 and move upon the ramps 116 in the fashion shown in FIGS. 2 and 4 thereby locking a toolholder within the base member 75. It should be noted that FIG. 4 shows the cam surface 170 to be in direct contact with the lock rod 95. While this would displace the lock rod 75 in the proper direction, a preferred design to be discussed is shown in FIG. 2 in which the cam 150 urges the lock rod 95 to the locked position using an intermediate spring/collar arrangement in which the cam post 160 acts against a collar 195 to compress a spring 200 connected to the rearward end 205 of the lock rod thereby urging the lock rod in the direction of arrow 117.

From FIGS. 1–4 it is seen that by rotation of the cam 150 from a forwardmost position shown in FIGS. 1 and 3 to a rearwardmost position shown in FIGS. 2 and 4, the lock rod is urged from an unlocked position to a locked position to secure the toolholder 10 to the toolholder base 75.

Figure 5:
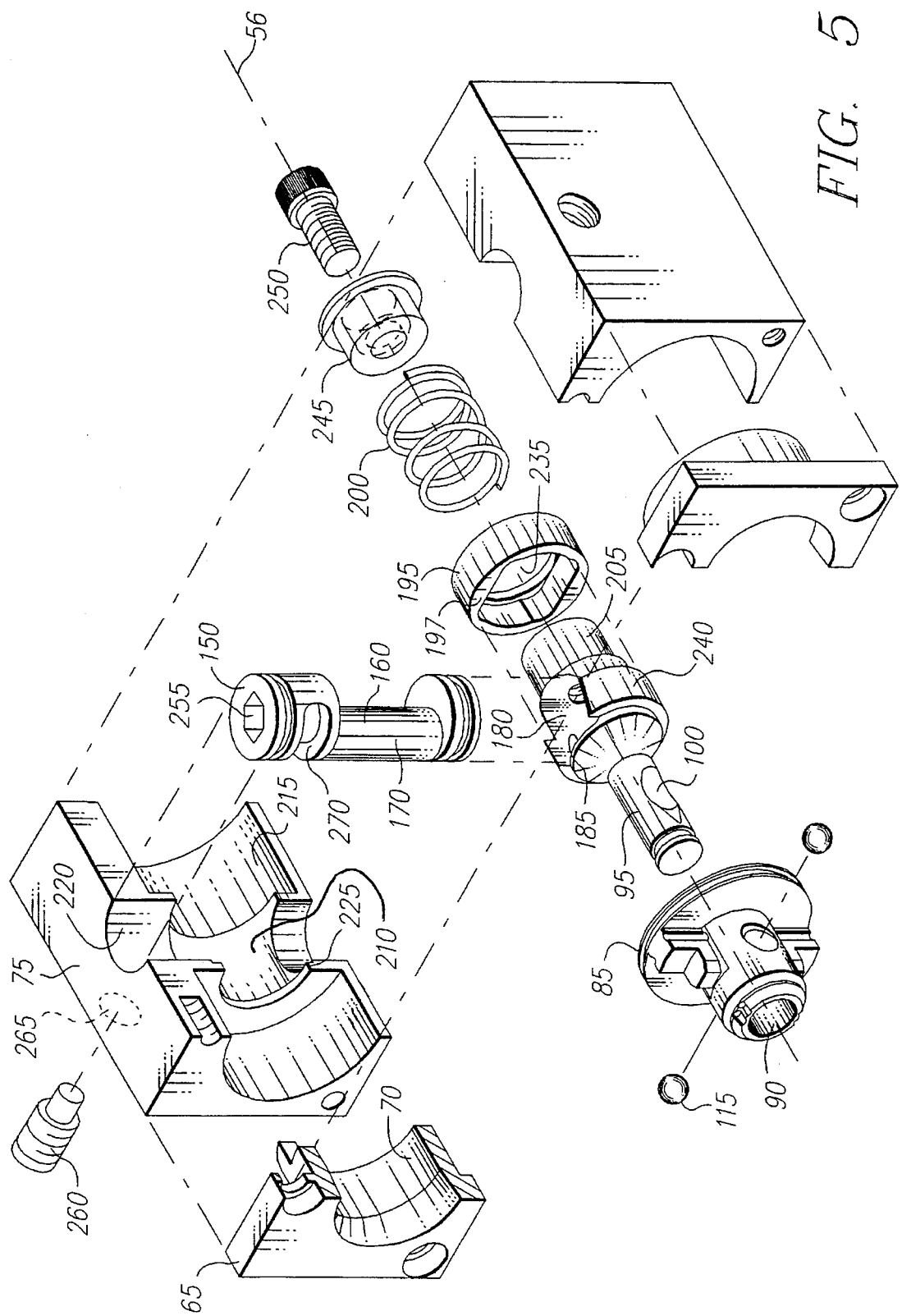
FIG. 5 illustrates an exploded isometric view of the subject invention.

FIG. 5 shows an exploded view of the apparatus according to the present invention. The base member 75 along with the toolholder receiving member 65 are shown split apart to reveal the bore 70 of the toolholder receiving member 65, a lock rod cavity 210 and a spring cavity 215 along the longitudinal axis 56 separated by a transverse circular opening 220 and lock rod guide 225 therebetween. The stub 85 which extends within the bore 70 itself has a bore 90 through which the lock rod 95 extends to align the locking elements 115 with the depressions 100 of the lock rod 95. The cam 150 with the cam post 160 fits within the aperture 180 of the lock rod 95 such that the cam surface 170 may contact the cam follower surface 185 of the lock rod 95. The cam 150 is laterally restrained by the transverse circular opening 220.

The collar 195 has an opening 235 which fits over the lock rod rearward end 205 until contact is made with the lock rod flange 240 thereby surrounding the cam post 160 of the rotatable cam 150. The collar 195 is urged against the lock rod flange 240 by the spring 200 which is secured to the lock rod rearward end 205 by a cap 245. The cap is connected to the lock rod rearward end 205 by a bolt 250 which is threadingly engaged with the lock rod rearward end 205. While shown in FIG. 5 as item 200 is a coil spring, this is for demonstrative purposes and a cluster of Belleville springs in series is the preferred hardware. The spring is compressed by the cap\bolt arrangement.

In the alternative a segment of the lock rod 95 may be made more flexible to provide resiliency thereby eliminating the need for the spring 200. As an example, the cross section of the lock rod 95 connecting the aperture 180 could be reduced. In this arrangement, the collar 195 could be eliminated in favor of the cam post 160 directly contacting the lock rod 95 to urge the lock rod 95 between the locked and unlocked positions. However, in this arrangement the aperture 180 should be reduced in size to enable the cam post 160 to reciprocate the lock rod 95.

The lock rod flange 240 engages the lock rod cavity 210 and provides lateral support to the lock rod 95 while permitting the lock rod 95 to travel along longitudinal axis 56. In such a fashion, the cam 150 may be rotated, preferably with a tool that may engage the cavity 255, to urge the lock rod 95 from the unlocked to the locked position.

From examination of FIG. 1, it should be noted that without a toolholder 10 in the bore 70, rotation of the cam will cause the lock rod 95 to reciprocate back and forth along longitudinal axis 56 as a unit no movement relative to the collar 195. Under these circumstances, the lock rod 95 will move within the bore 90 of the toolholder receiving member 65 and the locking elements 115 will freely move back and forth within the radial apertures 105.

However, when the toolholder 10 is placed within the bore 70 and the lock rod 95 is urged rearwardly, as shown in FIG. 2, by contact of the cam post 160 with the cam follower surface 197 of the collar 195. The locking elements 115 then move outwardly from the depressions 100 to the ramps 116 and contact the forwardly facing concave surface 60 of the toolholder shank 45 to engage the toolholder 10. At this point, continued rotation of the cam 150 will cause the collar 195 to separate from contact with the lock rod flange 240 and to slide along the lock rod 95 away from the lock rod flange 240 thereby compressing the spring 200 with the resultant spring force being transferred to the lock rod 95 through the bolt 250 which secures the spring 200 to the lock rod 95 as shown in FIG. 2. Gap 257 highlights this separation between the collar 195 and the lock rod flange 240.

It should be noted that the spring 200 is preloaded against the collar 195. The lock rod 95 may be retracted without engaging the spring 200 if the collar 195 is not displaced relative to the lock rod 95. However, as the locking elements 115 engage the tubular shank 45, the lock rod 95 becomes restrained and further movement of the collar 195 in the direction of arrow 117 will cause the collar 195 to move relative to the lock rod 95. This, in turn, will compress the spring 200 and transfer the entire preload force to the locking elements 115 to secure the tubular shank 45.

The collar 195 and lock rod 95 will move in the direction of arrow 117 until the locking elements 115 move from the depressions 100 to a location on the ramps 116 where the locking elements 115 engage the tubular shank 45. This distance is referred to as the locking stroke. The exact location on the ramps 116 at which the locking elements 115 engage the tubular shank 45 is dependent upon the manufacturing tolerances. For that reason, this locking distance will be referred to as the average locking stroke.

Figure 6:
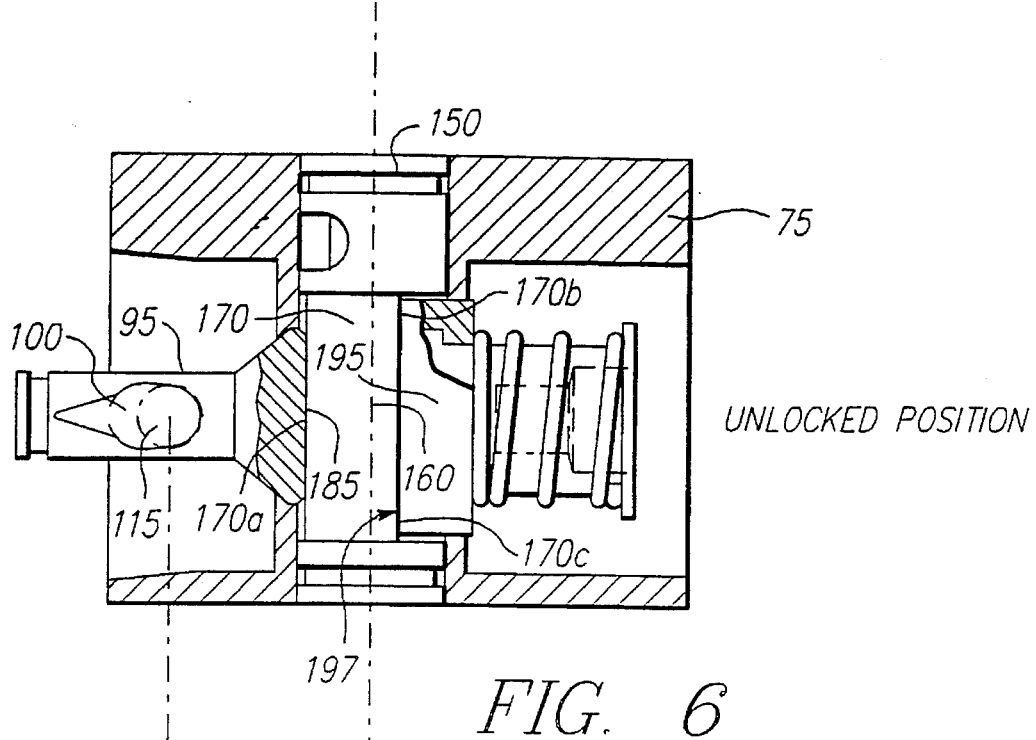
FIG. 6 shows a sectional side view rotated 90° from that view shown in FIG. 1.
Figure 7:
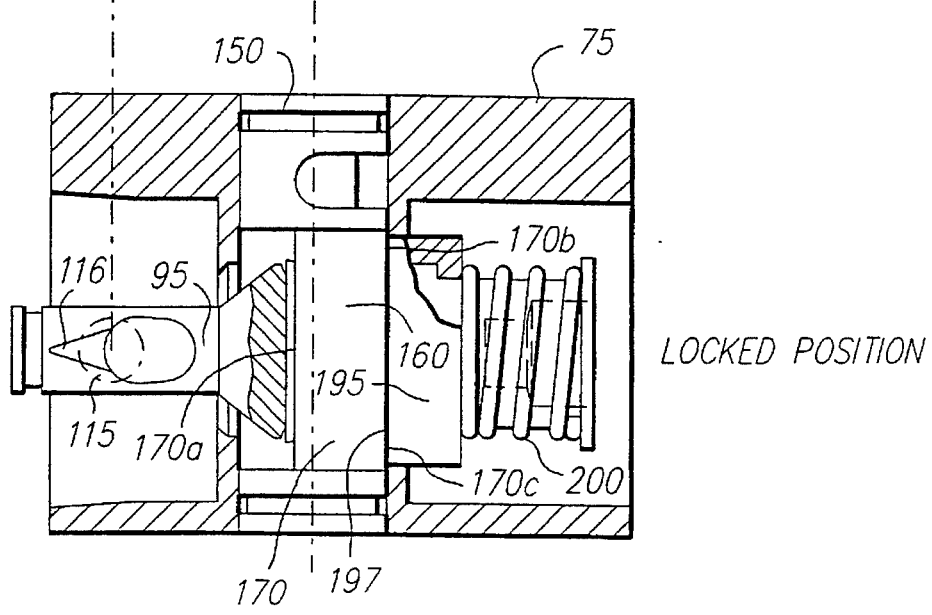
FIG. 7 shows a sectional side view rotated 90° from that view shown in FIG. 2.

This is again illustrated in FIGS. 6 and 7 which show a side sectional view of the apparatus in the unlocked and locked positions. In the unlocked position (FIG. 6), the cam surface 170 contacts the cam follower surface 185 of the lock rod 95. In this position, the locking element 115 (shown in phantom) rests within the depression 100 of the lock rod 95. For clarity in this view, the toolholder receiving member 65 (FIG. 5) has been omitted. As seen in FIG. 6, the thickness, or diameter of the cam post 160 is equal to or slightly less than the distance between the cam follower surface 185 of the lock rod 95 and the cam follower surface 197 of the collar 195. The collar 195 rests on the flange 240 (not shown) of the lock rod 95 to provide such a clearance.

However, in the locked position (FIG. 7), the locking elements 115 (shown in phantom) are displaced upon the ramp 116 until contact is made with the toolholder shank (not shown). For clarity, the toolholder receiving member 65 and the toolholder 10 have been omitted from this figure. At this point, further rotation of the cam 150 will result in displacement of the collar 195 along the lock rod 95 to compress the spring 200 thereby further retracting the lock rod 95.

Two significant features should be noted from FIGS. 6 and 7. FIG. 6 shows the cam surface 170 contacting the lock rod cam follower surface 185 in the middle section of the cam post 160 on cam surface 170a for the unlocked position. FIG. 7 shows the cam surface 170 contacting cam follower surface 197 of the collar 195 at top and bottom sections 170b, 170c of the cam surface 170, since the collar 195 has an opening 235 as seen in FIG. 5. This is important for two reasons.

First, symmetric contact between the cam surface 170 and the cam follower surfaces 185 and 197 minimizes the possibility of the lock rod 95 becoming jammed in the toolholder base 75 as a result of an asymmetric force on the lock rod 95 or collar 195. As an example, if the cam post 160 contacted the collar 195 at only the top portion of the cam surface 170, the collar 195 may tend to bind within the toolholder base 75 thereby making longitudinal displacement of the collar 195 difficult.

Second, separate longitudinal portions of the cam surface 170 are utilized for unlocking and locking the lock rod 95. As seen in FIG. 6, the middle section 170a of the cam surface 170 contacts the cam follower surface 185 of the lock rod 95 and the top and bottom sections 170b, 170c of the cam surface 170 contact the collar 195. In such a fashion, the wear surfaces between the cam post 160 and the follower surfaces 185 and 197 are distributed to minimize wear. As will be discussed, the contact of the collar 195 and the lock rod 95 on the cam post 160 may also occur at different radial locations.

Returning briefly to FIGS. 1 and 2, the rotatable cam 150 and the cam post 160 are shown in phantom. These positions are also shown in FIG. 8; however, for demonstrative purposes, the cam post diameter is reduced. As a reference, in referring to cam positions, the cam 150 rotation in which the cam post 160 is furthest from the toolholder 10 (not shown) will be identified is 0° and positive rotation will be identified as counterclockwise.

From FIGS. 8 and 1, it is seen that in the unlocked position the cam 150 is oriented at an angle of approximately 135°. While it is clearly possible to rotate the cam to the position described by 180°, the rotation is intentionally limited to less than 180° in order to reduce the range of cam rotation between the locked and unlocked positions. This is desirable when the toolholder base 75 is in a closed space and a tool, such as a wrench, used to rotate the cam may have a limited travel. The cam 150 is limited to this range of rotation by a set screw 260 (FIG. 5) threaded into a bore 265 in the toolholder base 75 to engage a groove 270 around the cam 150 in an arc extending approximately 135° corresponding with the desired cam 150 rotation.

Moving from the unlocked position shown as (B) in FIG. 8 and represented in FIG. 1 to the locked position shown in (A) in FIG. 8 and represented in FIG. 2, when the cam 150 is rotated clockwise from the unlocked position, the lock rod 95 is moved in the direction of arrow 117. The locking elements 115 are displaced from the depression 100 outwardly where with the toolholder 10 within the bore 70, the locking elements 115 engage the forwardly facing concave contact surfaces 60 of the toolholder 10. At this point, the longitudinal travel of the lock rod 95 is restricted. However, continued clockwise rotation of the rotatable cam 150 results in the cam surface 170 urging the collar 195 against the spring 200 thereby compressing the spring and increasing the rearward force pulling the lock rod 95 into a locked position.

The maximum displacement of the spring 200 will occur with the rotatable cam 150 rotated to 0°. However, in order to captivate the rotatable cam 150 in a position that minimizes the likelihood of the cam being suddenly returned to the unlocked position by the spring force, the cam 150 is over-rotated to a position of −5° and the rotation of the cam is restricted by the set screw 260 (FIG. 5) and groove 270 of the cam 150. While this over-rotation sacrifices some of the spring force exerted on the lock rod 95, the minimum loss of force is justified by the positive locking feature this provides.

FIG. 8 in conjunction with FIGS. 1 and 2 also illustrates that the cam rotation from the locked to the unlocked position is less than 180°. From the locked position when the cam 150 is rotated counterclockwise, the cam post 160 moves toward the tool holder 10 permitting the spring 200 to expand as the collar 195 moves toward the lock rod flange 240. When the collar 195 contacts the flange 240, further cam rotation causes the cam post 160 to contact the cam follower surface 185 of the lock rod 95. The lock rod 95 is then advanced in the direction of arrow 119 until the lock rod forward end 97 contacts the impact area 120 of the tool holder 10. At this point further cam rotation results in a positive action to bump the tool holder 10 from the base member 75. The apparatus is designed so that the range of rotation available for this positive action is approximately 45°.

As discussed, the contact along the cam post is symmetrical and occurs at a different length for the unlocked position and the locked position of the lock rod.

The design shown in FIGS. 1 and 2 include an additional feature. Even if the contact of the cam post occurred at the same length along the post, the rotation of the cam is limited so that different radial portions of the post are contacted for urging the lock rod to the locked and unlocked positions. As exemplified in FIG. 8, the cam post 160 contacts the collar to retract the lock rod along the section 272 shown as a dark line. The cam post 160 contacts the lock rod to unlock the lock rod along the section 274 shown as a dark line. Because these surfaces are at different radial locations on the cam post 160, wear on the cam post 160 is minimized.

With the toolholder positioned in the bore, clockwise rotation of the cam 150 illustrated in FIG. 8 provides movement of the cam post 160 which displaces the collar and conveys force to the lock rod. When the collar compresses the spring, this force is also conveyed to the lock rod. In order to achieve proper locking of the lock rod, it is not uncommon to generate spring forces of over 1,000 lb. This force is transmitted through the cam in the form of torque when the lock rod 95 is moved between the unlocked and locked positions. In general, the rotatable cam is rotated using a hand tool, such as a wrench and the high spring force generated is transferred through the cam to the wrench in the form of high torque. As a result, there may be an undesirable kicking action of the cam when moving between the locked and unlocked positions.

Figure 9:
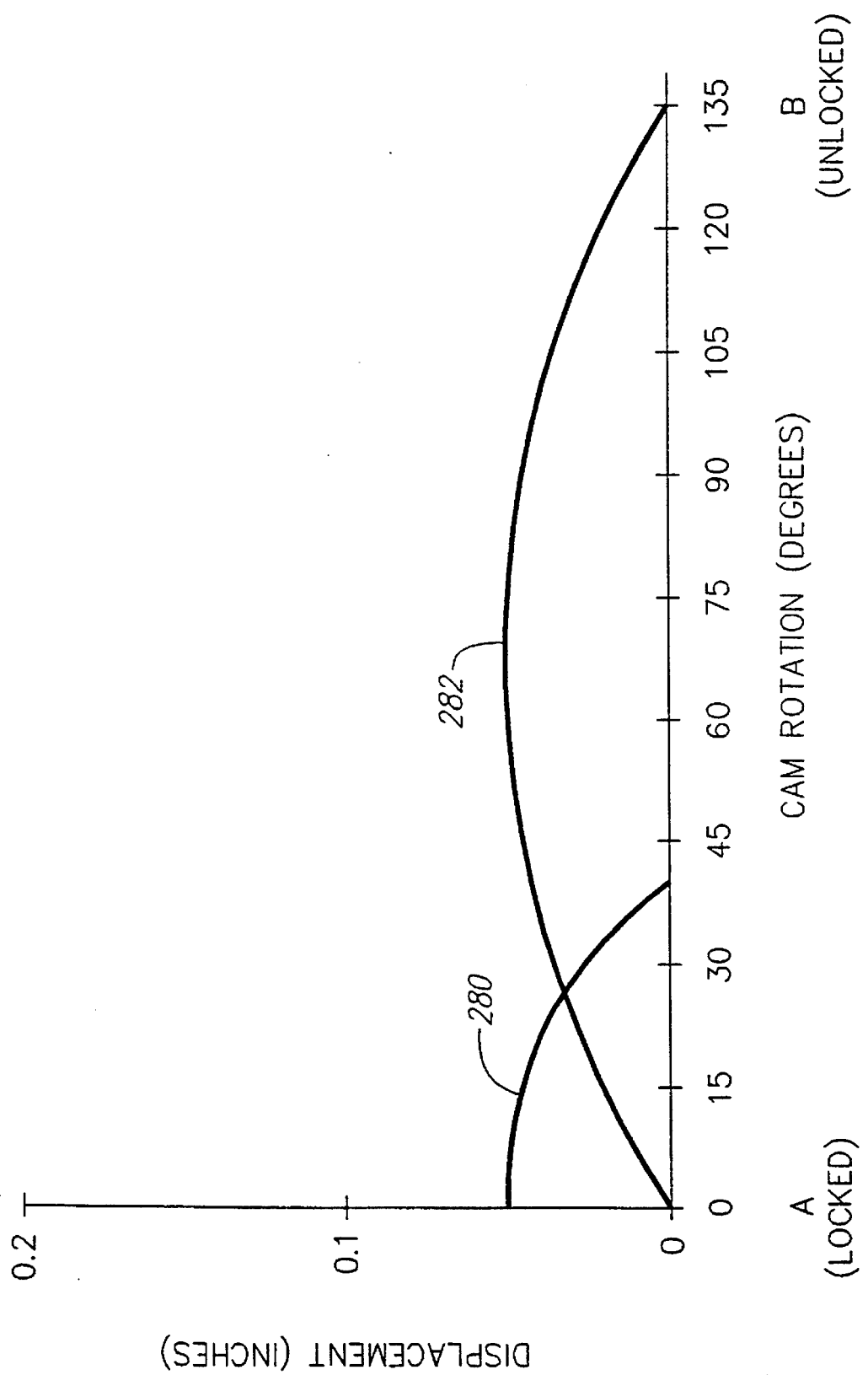
FIG. 9 shows a graph illustrating the displacement of the spring relative to the rotation of the rotatable cam in the subject invention.

FIG. 9 shows the cam post and spring displacement from the locked position (A) of the lock rod, corresponding to 0° rotation to the released position (B) corresponding to 135° rotation of the cam. Line 280 reflects displacement of the cam post 160 at the point of contact with the collar 195 as the cam is rotated from the locked to the unlocked position. As previously mentioned, the locked position of the cam 150 is actually at a rotation of −5°; however, for purposes of this discussion, that will not be illustrated in FIG. 9. From examining the line 280 as shown in FIG. 9, it can be seen that the slope gradually becomes steeper as the cam is rotated to the unlocked position. This same line shows the profile of the spring displacement until the collar 195 contacts the lock rod flange 240 which may occur at about 40° rotation. This would be a lock rod 95 position between that shown in FIGS. 1 and 2. At this point, upon further rotation of the cam, the spring no longer decompresses, but the lock rod is displaced in the direction of arrow 119 to release the toolholder 10. However, during the time the cam rotation influences the displacement of the spring, there is a significant force exerted upon the cam post which generates high torque. When, for a typical set of spring, the compression force is in excess of 1,000 lb., the force and associated torque transmitted by the cam required to lock and unlock the lock rod 95 then becomes significant in the importance of this kick is appreciated.

A design in which this kicking action is diminished is desirable and is the focus of a second embodiment of the subject invention. By altering the shape of the cam post from that of a cylinder, the displacement of the spring may be altered over the range of travel. Referring once again to the arrangement shown in FIG. 1, if the toolholder 10 is not placed within the bore 70, then when the cylindrical cam 150 is rotated from the unlocked position to the locked position, the entire unit comprised of the lock rod 75, the collar 195, the spring 200 and the end cap 205 move together as they are displaced by the cam post 160. With this arrangement, there is no relative movement between the collar 195 and the lock rod 95. It is only when the lock rod 95 is restrained by the toolholder 10 that the motion of the cam 150 acts against the collar 195 and compresses the spring 200. It is this motion that produces the curve 280 found in FIG. 9.

It has been found that by altering the profile of the cam post, the displacement of the spring may be favorably influenced to extend the range of rotation over which it is decompressed (or compressed) and additionally to introduce friction upon the cam post to diminish the kicking force generated using a purely cylindrical post. By introducing an eccentric lobe along the length of the cam post, the displacement of the spring acting directly to rotate the cam may be minimized. Specifically, the cam post may interfere with the spring decompression (or compression) so that the torque on the cam may be diminished. Additionally, the displacement of the spring may be distributed to decompress (or compress) the spring over a larger range of cam rotation thereby minimizing the high force transmitted over a short rotation in favor of a lower force transmitted over a greater rotation. Additionally, by extending the cam rotation for spring decompression (or compression), the force is distributed to the cam post in a rotational position of the post which offers a smaller moment arm thereby further reducing torque.

FIG. 10 shows a cam 150 having a cam post 160 with three distinct segments, 161, 162 and 163. Segments 161 and 162 are identical in profile to that shape previously discussed; however, segment 163 includes an additional lobe 290. FIG. 11 shows a cam 150 having a cam post 160 with a single segment 164 having a profile identical to that of segment 163 in FIG. 10. FIG. 12 shows a cross-section of the cam post 160 through segment 163 of FIG. 10 or segment 164 of FIG. 11. Given the radius r1 of cam post segments 161 and 162, segment 163 includes an additional lobe having a radius r2 which is blended with the radius r1 to form a continuous surface. Using as a baseline a line 167 intersecting the center line 165 of the cam post 160 and the center line 155 of the cam 150, a maximum deviation from radius r1 will occur at an angle of approximately 65° from the base. This is approximately in the middle of the travel of the rotating cam. The magnitude of radius r2 is approximately equal to the distance a locking element 115 travels from the base of the ramp 116 to that portion of the ramp 116 at which the locking element engages the tubular shank. This distance is referred to as the average locking stroke. While it is not illustrated in FIG. 10, it should be understood that segment 163 could be cylindrical with its centerline offset to conform to the lobe 290 seen in FIG. 12.

Recall that in FIG. 1, rotation of the cam 150 without the toolholder 10 in place would move the lock rod 75, collar 195, spring 200 and end cap 205 as a unit with no relative motion between the elements. Furthermore, the cylindrical cam post 160 would freely rotate within the lock rod aperture 180 between the cam follower surface 185 of the lock rod 95 and the cam follower surface 197 of the collar 195. The modified cam will produce a different result. Specifically, as shown in FIGS. 14 through 16 and as will be explained in greater detail, the modified cam 150 will act as a wedge between the cam follower surface 185 of the lock rod 95 and the cam follower surface 197 of the collar 195 thereby urging the two apart upon rotation. Even without the toolholder 10 positioned in the bore 70, rotation of the cam 150 will compress the spring to a maximum amount of the difference between r2 and r1.

FIG. 12 shows the cam in a locked position corresponding to (A) in FIG. 8. FIG. 13 shows the cam in the unlocked position corresponding to (B) in FIG. 8. Additionally 14 and 15 show a toolholder base 75 and toolholder 10 identical to those previously discussed and shown in FIGS. 1 and 2, with the exception that now the cam 150 has a post 160 similar to that shown in FIGS. 10 or 11. Upon rotating the cam 150 from the locked to the unlocked position, the collar 195 will follow the first segment 161 and the second segment 162 of the cam post 160 (or cam post 164) in a similar fashion to that previously described. However, with the introduction of the lobe 290, when the lock rod 95 is moved from the locked position to the unlocked position, while the overall result of this rotation is to permit the spring to decompress thereby tending to produce a kicking force, the lobe 290 will act upon the cam follower surface 185 of the lock rod 95 thereby slightly separating the lock rod flange 240 and the collar 195. This in turn will compress the spring causing both the lock rod 95 and collar 195 cam follower surfaces 185 and 197, respectively, to clamp the cam post 160. Line 282 shown in FIG. 9 represents the displacement of the spring caused by this relative motion between the lock rod and collar. At the middle of the cam rotation at approximately 65°, the spring displacement is at a maximum.

Using numbers which are believed to be representative of the invention, the maximum displacement between the lock rod 95 and the collar 195 occurs at approximately 65° of rotation and has a value of about 0.05 inches as shown in line 282. This value of 0.05 inches corresponds to the maximum spring displacement necessary for average locking forces.

As seen from line 282, using the circular cam discussed in FIGS. 1 through 8, the spring displacement of 0.05 inches would occur over a rotation of about 40°. With the modified lobe design found in FIGS. 10 and 11, the deflection of the spring according to line 280 is permitted only until the lobe of the cam interferes with such deflection as shown by line 282.

For demonstrative purposes, the line 280 has been superimposed on line 282 to show the actual spring deflection with the modified lobe. The actual spring deflection is shown by the upper segments of intersecting lines 280 and 282. The magnitude of the spring deflection due to the lobe occurs between 70° and 135°, a range of over 60° as opposed to the design exclusive of the lobed cam where the entire deflection occurred between 0° and 40°, a range of 40°.

FIG. 14 illustrates the cam with the modified lobe in place within the toolholder base 75. The lobe 290 is seen at a position adjacent to the cam follower surface 185 of the lock rod 95. As the cam 150 is rotated clockwise to the locked position, the lobe will act as a wedge against the cam follower surface of the lock rod thereby increasing the compression of the spring to a degree greater than that of the original cam profile at the beginning of the rotation but simultaneously acting to introduce friction resisting rotation. This is illustrated in the intermediate position shown in FIG. 16.

Further rotation advances the lobe 290 beyond contact with the cam follower surface 185 of the lock rod 95 until only the circular cam portions (161, 162 of FIG. 10 or 164 of FIG. 11) contact the follower surface 185. The cam 150 in the locked position is shown in FIG. 15.

The effect produced by the offset lobe 290 in the center section 163 of the cam post 160 could be duplicated if the center section 163 maintained a cylindrical profile and the top and bottom sections 161 and 162 each had a lobe similar to lobe 290. The desired effect is produced as long as the spring decompression (or compression) is spread over a larger range of rotation than that produced by the circular cam design discussed with FIGS. 1 through 8.

Finally, it should be appreciated that the orientation of the lobe 290 may be shifted 180° so that contact occurs with the collar 195 as opposed to the lock rod 95. However, as can be seen from FIG. 10, under such circumstances it would be necessary to interchange segment 161 and 162 with lobed segment 163.

What has been described is a cam mechanism which may be used to impart reciprocating motion to a lock rod of a quick change toolholder to secure the toolholder to a toolholder base or to release the toolholder from the toolholder base.

Changes in modification in the specifically described embodiments of this apparatus can be carried out without departing from the scope of the invention, which is intended to be limited only by the scope of the appended claims.

What is claimed is:

1. An apparatus for releasably holding a tubular toolholder shank, comprising:
   a) a base member having a forwardly facing surface and a bore intersecting the forwardly facing surface and extending rearwardly therefrom for receiving the toolholder shank;
   b) a lock rod with a forward and rearward end within the base member extending along a longitudinal axis and movable in a rearward and forward reciprocating motion for pulling the toolholder shank within the bore into a locked position and for pushing the toolholder shank from the bore to an unlocked position, said lock rod having an aperture transverse to said axis defining a forward wall to act as a lock rod cam follower surface;
   c) a rotatable cam mounted to the base member and having a cam post which extends through the aperture in the lock rod, the cam operable upon the lock rod to provide the rearward and forward reciprocating motion;
   d) a collar having a cam follower surface and slidably positioned to a flange on the lock rod proximate to the cam post;
   e) a spring positioned between the collar and lock rod rearward end for urging the lock rod to the locked position;
   f) wherein the cam post by rotation of the cam acts against the collar cam follower surface to compress the spring and urge the lock rod to the locked position and by rotation of the cam in the opposite direction to decompress the spring and unlock the lock rod; and
   g) wherein the cam post has a non-cylindrical profile to limit the spring decompression by creating interference between the lock rod cam follower surface and the collar cam follower surface.

2. The apparatus according to claim 1 wherein the cam post has a first cam segment comprised of a cylindrical section and a second cam segment comprised of a non-cylindrical section for contacting the lock rod cam follower surface and the collar cam follower surface.

3. The apparatus according to claim 2 wherein the non-cylindrical section has a maximum offset to create maximum interference between the follower surfaces at a rotational position between the locked and unlocked positions of the cam rotation.

4. The apparatus according to claim 3 wherein the maximum offset of the non-cylindrical section is approximately equal to the average locking stroke on the lock rod.

5. The apparatus according to claim 1 wherein the cam post is comprised of a cam segment having a singular non-cylindrical section for contacting the lock rod cam follower surface and the collar cam follower surface.

6. The apparatus according to claim 5 wherein the non-cylindrical section has a maximum offset to create maximum interference between the follower surfaces at a rotational position between the locked and unlocked positions of the cam rotation.

7. The apparatus according to claim 6 wherein the maximum offset of the non-cylindrical section is approximately equal to the average locking stroke on the lock rod.

8. The apparatus according to claim 1 wherein the cam post is comprised of a first cam segment having a cylindrical section and a second cam segment having a cylindrical section offset from the first section such that the lock rod cam follower surface and the collar cam follower surface are contacted and separated by the sections.

9. The apparatus according to claim 8 wherein the offset cylindrical section has a maximum offset to create maximum interference between the follower surfaces at a rotational position between the locked and unlocked positions of the cam rotation.

10. The apparatus according to claim 9 wherein the maximum offset of the non-cylindrical section is approximately equal to the average locking stroke on the lock rod.

* * * * *